Sept. 19, 1933.     F. W. DOUTHITT     1,927,603
EAR HOLDER AND GRIPPER
Original Filed Sept. 18, 1929    2 Sheets-Sheet 1
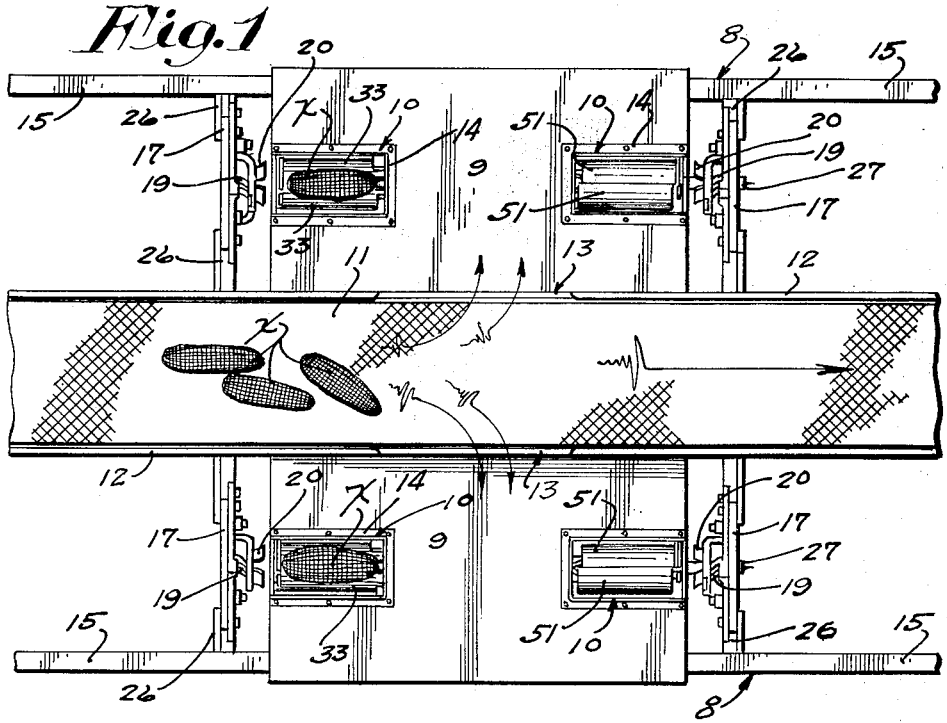
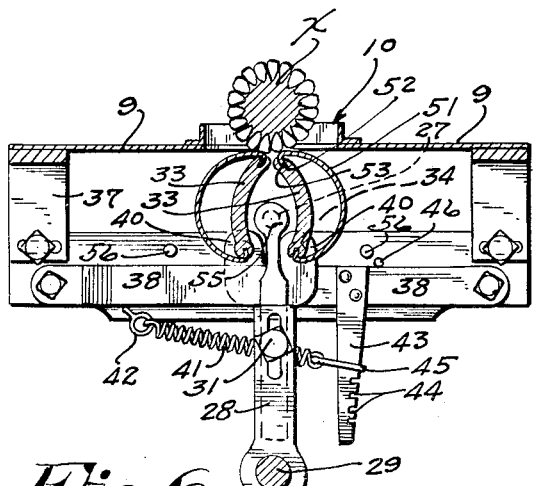
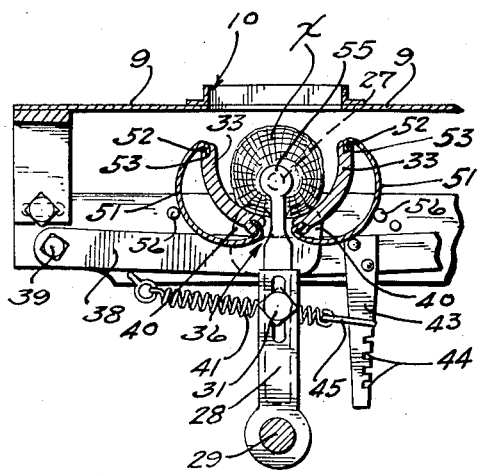
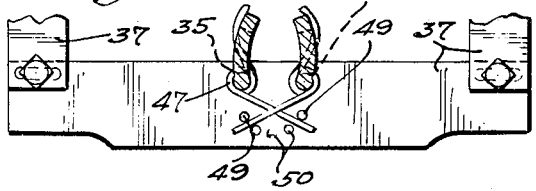
Inventor
Frank W. Douthitt
By his Attorneys
Merchant and Kirson Inventor
Frank W. Douthitt
By his Attorneys
Merchant and Gibson Patented Sept. 19, 1933

1,927,603

UNITED STATES PATENT OFFICE 1,927,603

EAR HOLDER AND GRIPPER

Frank W. Douthitt, Ortonville, Minn.

Application September 18, 1929, Serial No. 393,429. Renewed November 28, 1931

13 Claims. (Cl. 130—9)

My present invention has for its object the provision of a simple and highly efficient ear gripper and guide for use in connection with green corn cutting machines and is in the nature of an improvement on or refinement of the invention disclosed and broadly claimed in my pending application entitled "Ear holder for corn cutting machines", filed January 11, 1929 under Serial Number 331,857.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of two gang corn cutting machines having the invention embodied therein;

Fig. 4 is a view partly in rear elevation and partly in transverse vertical section taken on the line 4—4 of Fig. 2 and showing an ear on the closed gripper and guide;

Fig. 5 is a view corresponding to Fig. 4 with the exception that the gripper and holder is open, and the ear deposited therein;

Fig. 6 is a fragmentary detail view partly in elevation and partly in transverse vertical section taken on the line 6—6 of Fig. 2.

Figure 2:
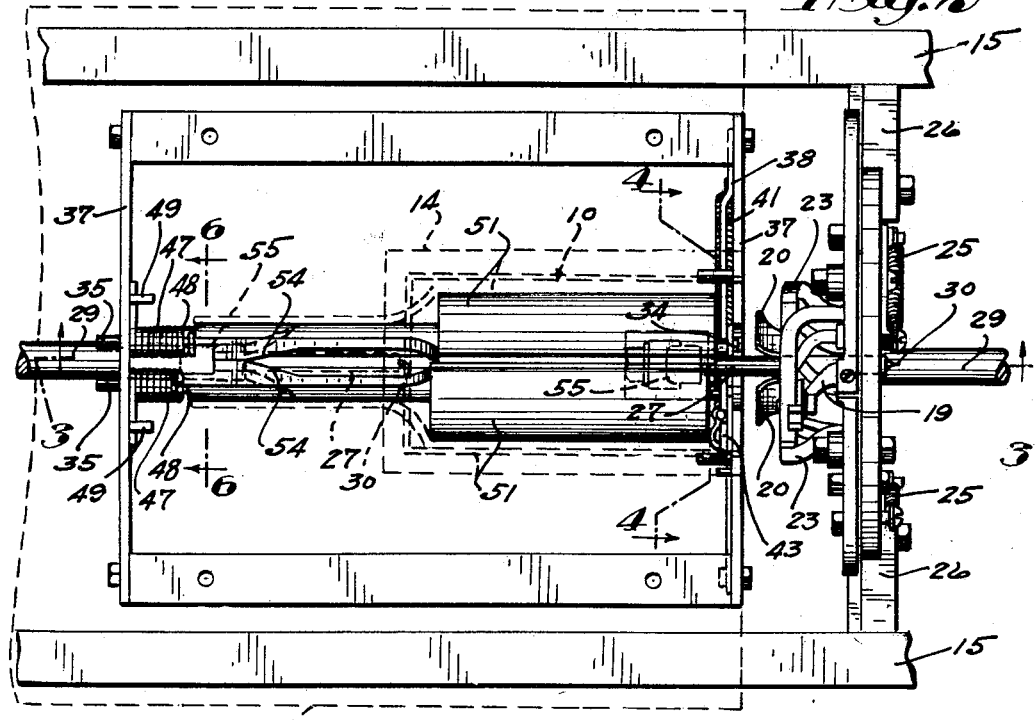
Fig. 2 is a plan view of one of the units of one of the gang corn cutting machines, on an enlarged scale, with some parts shown in different positions by means of broken lines.

In Fig. 1 is shown two laterally spaced gang green corn cutting machines indicated by the numeral 8 and each machine, as shown, includes two complete units. These machines are disclosed and broadly claimed in my pending application "Gang corn cutting machines", filed August 9, 1928, under Serial Number 298,565. Overlying the adjacent units of each machine 8 and supported from the frame thereof is a work table 9 having in its top, over each unit, a passageway 10 through which ears of corn are successively placed by hand on an underlying ear gripper and guide, which is the subject matter of the present application.

For the delivery of husked ears of green corn X to the work tables 9, there is mounted between the two machines 8 an endless belt conveyor 11, the upper or operative section of which is substantially in a plane above the tops of said tables. At the backs of the machines 8, on the frames thereof, are guide rails 12 provided to prevent the ears, on the conveyor 11, from dropping off the same. Formed in the guard rails 12, between adjacent units of each machine 8, is a passageway 13 through which ears of corn X may be scraped, by the operators who stand in front of the machines, from the conveyor 11 onto the tables 9. Surrounding each passageway 10, at its longitudinal edges and rear end, is an upstanding ear positioning flange 14, in the form of a U-shaped angle bar supported on the top of the tables 9 and rigidly secured thereto. This positioning flange 14 also prevents ears X from being accidentally scraped or pushed into the passageway 10.

The frame of each machine 8 may be of any suitable rigid structure and, as shown, only the front and rear longitudinal members 15 thereof are illustrated and on which members the tops of the tables 9 are supported and attached. As each unit of each machine is identical, the one with the other, the description of the one will suffice for the other, and for the purpose of this case it will only be necessary to briefly describe one of the units except its ear gripper and guide.

Figure 3:
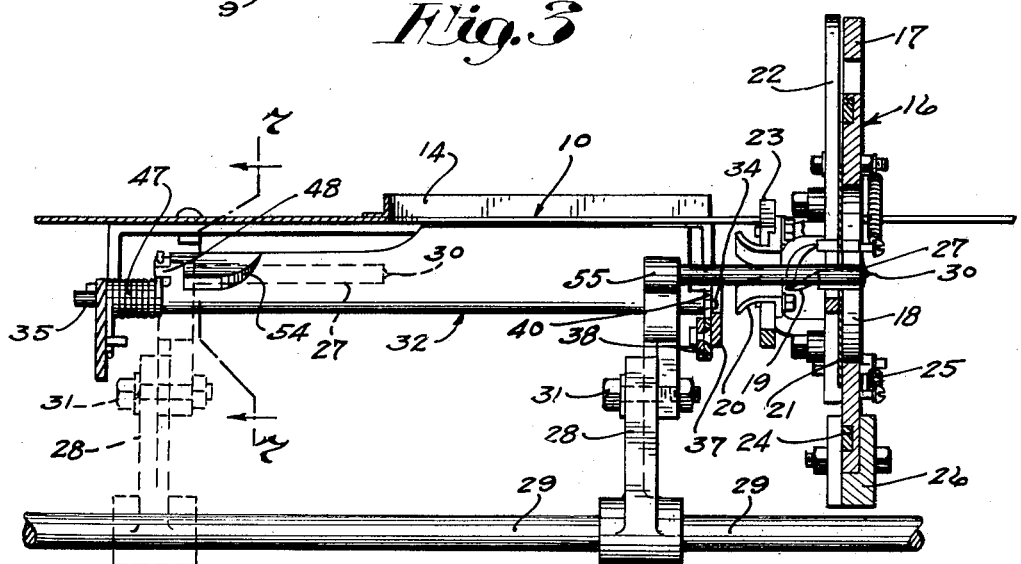
Fig. 3 is a view partly in side elevation and partly in central vertical section taken on the line 7—7 of Fig. 2.
Figure 7:
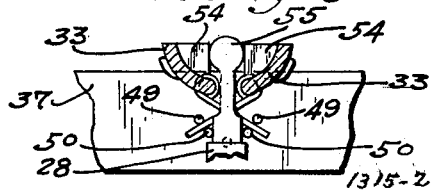
Fig. 7 is a fragmentary detail view partly in elevation and partly in transverse vertical section taken on the line 7—7 of Fig. 3.

Referring now in detail to one of the units, as best shown in Figs. 2 and 3. The numeral 16 indicates a cutter head comprising a head plate 17 having a feed passageway 18, an iris cutter 19, an iris depth gauge 20 and iris diaphragm 21 for closing said passageway. Said cutter 19, depth gauge 20 and diaphragm 21 are all axially aligned and axially spaced the one from the other and the passageway 18. The cutter 19 and diaphragm 21 are carried by main arms 22 intermediately pivoted to the head plate 17 at the back thereof, and the depth gauge 20 is carried by supplemental arms 23 on said main arms. Said main arms 22 are connected for common oscillatory movement by a shift ring 24 mounted on the head plate 17 and yieldingly held by springs 25 with the cutter 19, depth gauge 20 and diaphragm 21 contracted. The aligned axis of the passageway 18, cutter 19, depth gauge 20 and diaphragm 21 extends horizontally and longitudinally of the machine.

The cutter head 16 extends transversely of the machine 8 and is rigidly secured by brackets 26 on the frame members 15. This cutter head 16 is fully described and broadly claimed in my pending application S. N. 288,648, filed June 27, 1928 and an application executed of even date herewith and entitled "Cutter head for corn cutting machines".

The ears X are successively fed through the cutter head 16 by a reciprocating plunger 27 axially alinged with the cutter 19 and rigidly secured, at its rear end, to the upper section of a two-part upright arm 28, the lower section of which is rigidly secured to a horizontal shaft 29 from which it projects radially. This shaft 29 is mounted for endwise sliding movement and any suitable means, not shown, may be provided for reciprocating the same at the proper speed and with a period of rest at the completion of its retracting movement. The projecting movement of the shaft 29 carries the front or free end portion of the plunger 27 completely through the cutter head 16, and on which end is a sharp barb 30 arranged to engage the rear end of an ear at the axis thereof and feed the same through said head. The sections of the two-part arm 28 have longitudinal sliding interlocking engagement. A nut-equipped bolt 31, which extends through a hole in one of said sections and a vertical slot in the other thereof, is provided for frictionally clamping said arms together in different longitudinal adjustments to position the plunger 27 in axial alignment with the cutter head 16.

Referring now in detail to the improved ear gripper and guide 32, the same is of tubular formation and substantially axially aligned with the cutter head 16. Said ear gripper and guide 32 is longitudinally divided in a vertical plane, and the two sections or wings 33 thereof have, on the end of their lower longitudinal edge portions, a pair of relatively short front trunnions 34 and a pair of relatively long rear trunnions 35. The trunnions of each pair 34—35 extend substantially parallel to each other and to the axis of the cutter head 16. Said wings 33, at their lower longitudinal edges, are laterally spaced to leave a passageway 36 through which the arm 28 projects and supports the plunger 27 within the ear gripper and guide 32.

The gripper and guide 32 is mounted, as shown, in a secondary frame 37 rigidly secured to the table 9 and the rear pair of trunnions 35 are journaled in the rear member of said frame with a freedom for slight angular movements. This gripper and guide 32, at the front end of the supplemental frame 37, is yieldingly supported to float in a vertical plane on a toggle lever 38, which extends horizontally and transversely of and under said gripper and guide. Said toggle lever 38, at the outer ends of its arms, is pivoted on headed studs 39 and secured in the front end member of the secondary frame 37 with freedom for slight longitudinal sliding movement on said studs to compensate for the varying length of the toggle lever 38 during its buckling and straightening movements.

Formed on the inner ends of the arms of the toggle lever 38 are two upstanding bearing lugs 40, in which the front pair of trunnions 34 is journaled, with freedom for slight angular movements in respect thereto. The toggle lever 38 is yieldingly and normally held straight by a coiled spring 41 anchored at 42 to the front member of the supplemental frame 37, under one of the arms of said toggle, and adjustably secured at its other end to a depending post 43, rigidly secured to the other arm of said toggle. Formed in the post 43 is a plurality of vertically spaced notches 44, any one of which is adapted to receive a ring 45 attached to the respective end of the spring 41. Obviously, by adjusting the ring 45 in the different notches 44, the tension of the spring 41 may be varied at will and the leverage between said spring and toggle lever 38. A stop pin 46, in the front end member of the supplemental frame 37, is arranged to be engaged by one of the arms of the toggle 38 to limit the straightening movement of said toggle.

The wings 33 are individually and yieldingly held closed by coiled springs 47 encircling the rear trunnions 35 between said wings and the rear member of the supplemental frame 37. The front ends of the springs 47 engage lugs 48 on the rear ends of the wings 33 and their other ends engage stop pins 49 on the rear member of the supplemental frame 37, see Fig. 6. These pins 49 may be shifted into different holes 50 in said supplemental frame member to vary the tension of the springs 47. The closing movement of the wings 33 is limited by the engagement of the upper longitudinal edge portions of said wings with each other, see Fig. 4.

The passageway 10, below the top of the table 9, is open and closed by a gate 51 actuated by the ear gripper and guide 32 in timed relation to the open and closing of its wings 33 to prevent the escape of the ear from said passageway when said gripper and guide is closed. This gate 51, as shown, comprises two sections carried by the wings 33 and each of which is substantially semi-circular in cross-section. These sections of the gate 51 work close to and under the longitudinal edges of the table 9 at the passageway 10. The sections of the gate 51 are preferably made from sheet metal and secured to the wings 33 by having their longitudinal edge portions bent laterally inward to form lock flanges 52, which extend into lock grooves 53 in the upper and longitudinal edge portions of said wings. These sections of the gate 51 are preferably applied to the wings 33 by sliding their flanges 52 endwise into the grooves 53.

As previously stated, the wings 33 are yieldingly held closed by the springs 47 and to open said wings and hence the gate 51 there is formed on the inner surfaces thereof, at their rear end portions, a pair of cams 54 in V-shaped arrangement and a co-operating cam head 55 is formed on the upper end of the upper section of the arm 28. During the retracting movement of the plunger 27 the cam head 55 engages the cam surfaces 54 and thereby spreads or opens the wings 33 against the tension of the springs 47 and holds the same open during the period of rest of said plunger, as shown in Fig. 5.

The operation of one of the units of one of the above described corn cutting machines may be described briefly as follows: it may be assumed that a supply of ears X is always on the respective table 9 which are delivered thereto by the conveyor 11. These ears X are picked up by an operator, who usually looks after two units, and successively placed longitudinally on the closed gripper and guide 32 through the passageway 10, while the previously placed ear is being fed by the plunger 27 from said closed gripper and guide to the cutter head 16. In placing an ear on the gripper and guide 32, the same is held in a horizontal position preferably with its small or tapered end projecting toward the cutter head 16. The gate 51, at this time, is closed and prevents the escape of the placed ear in case the same should roll from the gripper and guide 32 and will support said ear in case the same is not properly placed on the gripper and guide 32.

During the retracting movement of the plunger 27 its cam head 55 engages the cam surfaces 54 and opens the wings 33 and hence the gate 51 and causes the placed ear X to drop into the open gripper and guide 32 during the period of rest of said plunger. At the completion of this period of rest, the cam head 55, during the initial projecting movement of the plunger 27, is withdrawn from between the cam surfaces 55 and thereby permits the springs 47 to close the wings 33 onto the ear and thereby automatically and substantially centers the same with the cutter head 16 forward of the plunger 27.

Stop pins 56 are arranged to be engaged by the gate sections 51 and limit the opening movement of the wings 33.

While an ear X is thus held, the rear end thereof is engaged by the advancing plunger 27 which forces its barb 30 therein and feeds the ear longitudinally in the gripper and guide 32 to the cutter 17. As the front end portion of the ear enters the iris depth gauge 20, it expands the same and thereby automatically positions the blades of the cutter 19 for action on the ear X. During the advancing movement of the ear X by the plunger 27, the kernels are removed from the cob by the cutter 19 and drop onto a travelling conveyor or into a receptacle, not shown, provided to receive the same. The diaphragm 21 prevents the kernels from following the cob as they are cut therefrom thus preventing waste. In case the gripper and guide 32 is closed, as shown in Fig. 5, by the time the operator places an ear in the passageway 10 said ear will be deposited directly in said gripper and guide.

In case an ear, in the gripper and guide 32, is of medium size, it will be held substantially aligned with the depth gauge 20, but in case the ear is large, it will be considerably out of alignment therewith. In this case the ear, as the same is forced into the cutter head 16, will be moved laterally and in turn move the front end portion of the gripper and guide 32 downward, which is held for floating movement, by the toggle lever 38, and thereby bring the gripper and guide into alignment with the cutter head 16 to prevent binding between the ear and gripper and guide which would interfere with the feeding of the ear. As the wings 33 are yieldingly clamped onto the ear therein, said wings will yield in case a lateral horizontal movement is imparted to the ear during its movement into the cutter head 16.

The above method of placing an ear in the passageway 10 and on the closed gripper and guide 32 eliminates all danger of the operator being hurt. By adjusting the tension of the springs 47 the wings 33 may be caused to grip an ear of corn, with the desired pressure, to center the same but permit free feeding movement therethrough without undue pressure required to operate the plunger 27.

What I claim is:

1. In a corn cutting machine, the combination with a cutter head, of an ear gripper and guide comprising a pair of wings, a toggle lever set vertically edgewise transversely of the gripper and guide, said wings at their front ends being journaled on the toggle lever, a post on one of the arms of the toggle lever extending in the direction of the movement thereof, and a spring anchored to a relatively fixed support in respect to the toggle lever attached to said post and yieldingly holding the toggle lever in one of its extreme positions.

2. The structure defined in claim 9 in which the spring is longitudinally adjustable on the post to vary its tension.

3. The combination with a work table having a passageway, of an ear holder and guide under the passageway and comprising upwardly extended wings mounted for opening and closing movements, said wings when closed being arranged to externally support an ear placed thereon through the passageway in the table, said table being arranged to prevent accidental escape of an ear between the table and holder and guide.

4. The structure defined in claim 3 which further includes a guard surrounding the passageway in the table.

5. A tubular ear holder and guide comprising a pair of outwardly and transversely bowed wings mounted for opening and closing movements and having lock grooves in their longitudinal edges, and gates forming coverings for the wings and having lock flanges seated in the lock grooves to attach the gates to the wings.

6. In a corn cutting machine, the combination of a stationary ear supporting table having a feed opening therethrough, ear holding means located beneath the opening in the table and adjacent the under side of said table, said ear holding means having members mounted for opening and closing movements and shaped on their outer faces to substantially close said opening when said members are together and support an ear thereon, and said members having their inner faces shaped to receive the ear therebetween when said members are separated, and center and guide the ear, a corn cutting means associated with said ear receiving means in alinement therewith, and means for feeding the ear from the receiving means into and through the cutting means.

7. In a corn cutting machine, the combination of a stationary ear supporting table having a feed opening therethrough, an ear receiving means located beneath the opening in said table, said feed opening being so sized as to receive one ear at a time and direct the same to said ear receiving means, said ear receiving means including opposed devices having means for supporting an ear when in closed position while in said opening, a corn cutting means associated with said ear receiving means, and means for feeding the ear from said receiving means and into and through said cutting means.

8. In a corn cutting machine, the combination of a stationary ear supporting table having a feed opening therethrough, ear receiving means located beneath the opening in said table and adjacent the under side of said table, said feed opening being so sized as to receive one ear at a time and direct the same to said ear receiving means, said ear receiving means including members adapted to be moved away from each other for receiving the ear therebetween for centering and guiding said ear, said members being constructed so as to support the ear when in closed position while the ear is in said opening, a corn cutting means associated with said ear receiving means and in alinement therewith, and means for feeding the ear from the receiving means into and through the cutting means.

9. A corn cutting machine comprising a stationary ear receiving and supporting table having a plurality of openings therethrough, an ear receiving means associated with each opening, each opening being so sized as to receive one ear at a time and direct the same to the ear receiving means associated therewith, said ear receiving means including opposed devices having means for supporting the ear when in closed position while the ear is in said opening, a corn cutting means associated with each ear receiving means, and means for successively feeding the ears from said receiving means into and through the cutting means.

10. A corn cutting machine comprising a stationary ear receiving and supporting table having a plurality of openings therethrough, an ear receiving means associated with each opening and located beneath said table adjacent the under side thereof, each opening being so sized as to receive one ear at a time and direct the same to the ear receiving means associated therewith, said ear receiving means including opposed devices having means for supporting an ear when in closed position while in said opening, a corn cutting means associated with each ear receiving means and devices operating alternately to separate first one ear receiving means and then the other so that the ear supported thereon will fall between said devices into alinement with the cutting means and to feed the ear from said ear receiving means into and through the cutting means associated therewith.

11. In a corn cutting machine, the combination of a stationary ear supporting table having a feed opening therethrough, an ear receiving means located beneath the opening in said table, said feed opening being so sized as to receive one ear at a time and direct the same to said ear receiving means, said ear receiving means including opposed devices having means for supporting an ear when in closed position while in said opening, a corn cutting means associated with said ear receiving means, and means for feeding the ear from said receiving means and into and through said cutting means, said table having a laterally projecting portion surrounding said opening for aiding in positioning the ear in the opening on the ear receiving means.

12. In a corn cutting machine, the combination of a stationary ear supporting table having a feed opening located within the limits of the table and extending therethrough, an ear receiving means located beneath the opening in said table, said feed opening being so sized as to width and length as to receive one ear at a time and direct the same to the ear receiving means, said ear receiving means including opposed devices having means for supporting an ear when in closed position while the ear is in said opening, a corn cutting means associated with said ear receiving means, and means for feeding the ear from the receiving means into and through the cutting means.

13. A corn cutting machine including a pair of spaced corn cutting devices, a stationary table extending substantially from one corn cutting device to the other, an ear receiving means associated with each corn cutting device and located beneath said table, an opening through the table in the region of each ear receiving means, said opening being sized so as to receive one ear at a time and direct the same to the ear receiving means, said ear receiving means including opposed devices having means for supporting an ear when in closed position while the ear is in said opening, and means for successively feeding the ears from the receiving means into and through the cutting devices.

FRANK W. DOUTHITT.